Sept. 29, 1931.  R. A. McCANN  1,825,236
RAILWAY TRACK CIRCUITS
Filed April 22, 1931
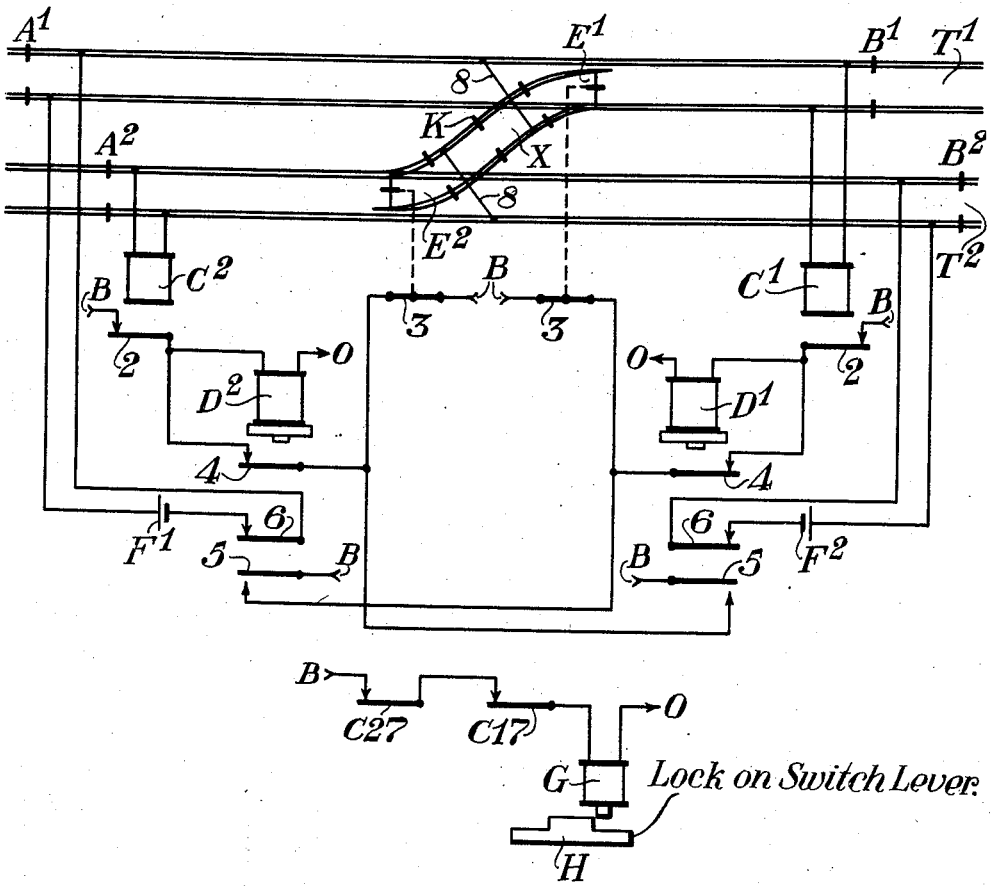
INVENTOR.
R. A. McCann,
BY
His ATTORNEY.

Patented Sept. 29, 1931

1,825,236

UNITED STATES PATENT OFFICE

RONALD A. McCANN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRACK CIRCUITS

Application filed April 22, 1931. Serial No. 532,027.

My invention relates to railway track circuits, and particularly to track circuits for two railway tracks which are connected by a crossover. One feature of my invention is the provision of means for preventing the two track relays for the two tracks from being simultaneously closed for a short interval of time while a vehicle is passing from one track to the other through the crossover.

I will describe one form of track circuit apparatus embodying my invention, and will then point out the novel features thereof in claims.

The accompanying drawing is a diagrammatic view showing one form of apparatus embodying my invention.

Referring to the drawing, the reference characters $T^1$ and $T^2$ designate two parallel railway tracks, the former of which is provided with a track section $A^1$—$B^1$, and the latter with a track section $A^2$—$B^2$. These two track sections are connected by a crossover X, comprising the usual switches $E^1$ and $E^2$.

Section $A^1$—$B^1$ is provided with a track circuit comprising the rails of this section, as well as the rails of the crossover X up to an intermediate point K; and section $A^2$—$B^2$ is provided with a track circuit including the rails of this section, as well as the rails of crossover X up to the same intermediate point K. That is to say, the rails of crossover X on the right-hand side of the intermediate point K are bonded into the rails of section $A^1$—$B^1$ by the usual means including a crossbond 8, and the rails of this crossover on the left-hand side of the point K are similarly bonded into the rails of section $A^2$—$B^2$.

Section $A^1$—$B^1$ is provided with the usual track relay $C^1$ which is connected across the rails at the right-hand end of the section, and with the usual source of track circuit current $F^1$, which, as here shown, is a battery, and which is normally connected across the rails at the left-hand end of the section through a front contact 6 of an auxiliary slow-releasing relay $D^2$. Similarly, the track circuit for section $A^2$—$B^2$ is provided with a track relay $C^2$ connected across the rails at the left-hand end of the section, and with a track battery $F^2$, which is normally connected across the rails at the right-hand end of the section through a front contact 6 of an auxiliary slow-releasing relay $D^1$. Each switch E is provided with a contact 3 which is closed when the switch is in the normal position, and is open when the switch is in the reverse position.

Auxiliary relay $D^1$ is provided with a pick-up circuit which passes from terminal B of a suitable source of current, through front contact 2 of track relay $C^1$, and the winding of relay $D^1$ to terminal O of the same source of current. The relay $D^1$ is provided with a first stick circuit which passes from terminal B, through contact 3 of switch $E^1$, front contact 4 of relay $D^1$, and the winding of relay $D^1$ to terminal O. Relay $D^1$ is provided with a second stick circuit which passes from terminal B, through back contact 5 of relay $D^2$, front contact 4 of relay $D^1$, and the winding of relay $D^1$ to terminal O.

Auxiliary relay $D^2$ is provided with pick-up and stick circuits similar to those for relay $D^1$. That is to say, the pick-up circuit for relay $D^2$ includes front contact 2 of track relay $C^2$, the first stick circuit for relay $D^2$ includes contact 3 of switch $E^2$ and front contact 4 of relay $D^2$, and the second stick circuit for relay $D^2$ includes back contact 5 of relay $D^1$ and front contact 4 of relay $D^2$.

The lever for the control of switches $E^1$ and $E^2$ is provided with a locking device H, which is controlled by a lock magnet G in such manner that the lever cannot be moved from either extreme position to the other unless the magnet G is energized. The switch lever, and the mechanism for operating the switches by this lever, form no part of my present invention, and, consequently, they are omitted from the drawing in order to simplify the disclosure. Magnet G is provided with a circuit which includes front contact C27 of track relay $C^2$, and front contact C17 of track relay $C^1$, and so it will be seen that the switches can be operated when and only when both of the track relays are closed.

The operation of the apparatus is as follows: Assuming that the switches $E^1$ and $E^2$ are in their normal positions and that a car or train moving toward the right on track $T^2$ enters section $A^2$—$B^2$, track relay $C^2$ will be opened, but relay $D^2$ will remain closed due to its stick circuit through contact 3 of switch $E^2$, and, consequently, the track circuit for section $A^1$—$B^1$ will not be affected. When the car or train passes out of section $A^2$—$B^2$, track relay $C^2$ will again close, and the apparatus will be restored to its normal condition. Similarly, when a train moving toward the left on track $T^1$ enters section $A^1$—$B^1$, it will open track relay $C^1$, but relay $D^1$ will remain energized due to its stick circuit through contact 3 of switch $E^1$, and so the track circuit for section $A^2$—$B^2$ will not be affected.

I will now assume that the switches $E^1$ and $E^2$ of the crossover X are reversed, and that a train moving toward the right on track $T^2$ enters section $A^2$—$B^2$. Track relay $C^2$ will open, and this will open relay $D^2$ because the first stick circuit for this relay is opened at contact 3 and the second stick circuit is open at contact 5. The opening of contact 6 of relay $D^2$ will disconnect battery $F^1$ from the rails of section $A^1$—$B^1$, so that track relay $C^1$ will open. Relay $D^1$ will remain closed, however, because of its second stick circuit through back contact 5 of relay $D^2$. When the vehicle passes the intermediate point K in the crossover X, track relay $C^2$ will close because battery $F^2$ is still connected with the rails of track $T^2$ through contact 6 of relay $D^1$. Relay $D^2$ will then close, because its pick-up circuit will be closed at contact 2 of relay $C^2$. The opening of back contact 5 of relay $D^2$ will open the second stick circuit for relay $D^1$, so that this relay will again open, thereby opening at its contact 6 the track circuit for section $A^2$—$B^2$, whereupon track relay $C^2$ will again open. Auxiliary relay $D^2$ will, however, remain closed because its second stick circuit will be closed at back contact 5 of relay $D^1$. When the rear end of the vehicle passes out of section $A^1$—$B^1$, track relay $C^1$ will close, and this will energize relay $D^1$, thereby connecting battery $F^2$ with the rails of section $A^2$—$B^2$, with the result that track relay $C^2$ will again close. The parts of the apparatus will then be restored to their normal conditions.

The operation of the apparatus during the passage of a vehicle from track $T^1$ to track $T^2$ through the crossover X will be understood from the foregoing without detailed explanation.

When the two track circuits for the sections $A^1$—$B^1$ and $A^2$—$B^2$ are independent, it is possible when a light engine or a gasoline electric car passes through the crossover that the track relay for the section which the vehicle is leaving will close before the track relay for the section which the vehicle is entering will open, so that for a brief interval of time both track relays may be closed, with the result that during this brief interval of time the switches $E^1$ and $E^2$ are unlocked. This condition is prevented with apparatus embodying my invention, because when the switches are in their reversed positions and a vehicle enters either track section, it will open the track circuit for the other section, so that when the vehicle passes through the crossover, the track relay for the section which it is about to enter is already open.

Although I have herein shown and described only one form of track circuit apparatus embodying my invention, it is understood that various changes and modifications may be made therein within the scope of the appended claims without departing from the spirit and scope of my invention.

Having thus described my invention, what I claim is:

1. In combination, two parallel railway tracks each provided with an insulated track section, a crossover connecting said two sections, a track circuit for each section including the rails of the section and the rails of said crossover on the adjoining side of a common intermediate point as well as the usual track relay and source of track circuit current, means operating when the switches of said crossover are reversed and a vehicle enters one track section to open the track circuit for the other track section and to keep it open until the vehicle passes said intermediate point in the cross over, and means for preventing operation of the switches of said crossover unless both of said track relays are closed.

2. In combination, two parallel railway tracks each provided with an insulated track section, a crossover connecting said two sections, a track circuit for each section including the rails of the section and the rails of said crossover on the adjoining side of a common intermediate point as well as the usual track relay, an auxiliary relay for each section, a pick-up circuit for each auxiliary relay including a front contact of the associated track relay, a stick circuit for each auxiliary relay including a contact closed only when the associated switch of said crossover is in normal position, a second stick circuit for each auxiliary relay including a back contact of the other auxiliary relay, a source of track circuit current for each section connected across the rails of the section through a front contact of the auxiliary relay for the other section, and means for preventing operation of the switches of said crossover unless both of said track relays are closed.

3. In combination, two parallel railway tracks each provided with an insulated track section, a crossover connecting said two sections, a track circuit for each section including the rails of the section and the rails of said crossover on the adjoining side of a common intermediate point as well as the usual track relay and source of track circuit current, means operating when the switches of said crossover are reversed and one track relay is opened by a vehicle entering the associated section to open the track circuit for the other section and to keep it open until the vehicle passes said intermediate point in the crossover, and means for preventing operation of the switches of said crossover unless both of said track relays are closed.

4. In combination, two parallel railway tracks each provided with an insulated track section, a crossover connecting said two sections, a track circuit for each section including the rails of the section and the rails of said crossover on the adjoining side of a common intermediate point as well as the usual track relay and source of track circuit current, means operating when the switches of said crossover are reversed and one track relay is opened by a vehicle entering the associated section to open the track circuit for the other section and to keep it open until the vehicle passes said intermediate point in the crossover, means operating when the switches of said crossover are in normal positions to prevent the said one track relay from opening the other track circuit, and means for preventing operation of the switches of said crossover unless both of said track relays are closed.

In testimony whereof I affix my signature.

RONALD A. McCANN.